Dec. 1, 1953     T. R. LUCZKO     2,661,410

BRAKE FLUID SAFETY INDICATOR

Filed Nov. 13, 1950

*Inventor*
Thomas R. Luczko

By *Clarence A. O'Brien
and Harvey B. Jacobson*
                                            *Attorneys*

Patented Dec. 1, 1953

2,661,410

UNITED STATES PATENT OFFICE 2,661,410

BRAKE FLUID SAFETY INDICATOR

Thomas R. Luczko, Johnstown, Pa., assignor of sixteen per cent to Joseph Luczko, sixteen per cent to Charles Finch, and sixteen per cent to Nick Finch, Johnstown, Pa.

Application November 13, 1950, Serial No. 195,271

3 Claims. (Cl. 200—84)

My invention relates to novel and useful improvements in a brake fluid safety indicator, and more specifically relates to a device to warn the operator of any vehicle using hydraulic brakes as in trucks, buses or passenger cars when the fluid is low. A principal object is to provide a warning system to safeguard the occupants and the vehicle from the hazard of non-operative hydraulic brakes in the event of the brake fluid in the master cylinder being low due to leaks, seepage between connections, perforation of the wheel cylinder, or rupture of the lines or closures due to deterioration of synthetic or other rubber fluid retainers, or for any other reason.

An important purpose of the device is to provide a replacement attachment for those master cylinders already on the market or in use which can be easily attached by any automobile mechanic.

Another important object is to provide a standard insert mechanism on a sleeve to fit a blank plug, the plugs being fitted to each car brake cylinder on the market, but the insert sleeve being a standard mechanism to fit most applications.

Yet another intention of the invention is to have the contact switch on the warning device move between wide limits to provide for clearing the contact of deterioration products of synthetic or other rubber used in the communication system in hydraulic brakes, of metal or other suspended particles usual in such systems.

Another aim is to provide a baffle on the supporting structure to prevent or minimize the splashing of brake fluid onto the contacts with a resultant arcing through the liquid of the brake fluid, and to provide in the baffle a guide for direction of the plunger to contact properly the other electrical terminal.

Another subsidary purpose is to provide a lever system with a large movement of the plunger contact to further promote clearing of the contact. Likewise another ancillary purpose is to provide a nearly vertical plunger movement so that clearing of the point of debris, deterioration products, and arcing metal deposits by gravity from the contact point is facilitated.

Another important consideration is to provide two adjustments, a stem adjustment on the float for pre-setting the lever movement and hence the amount of plunger excursion according to the liquid level, and secondly to provide by the central sleeve adjustment for adjusting the vertical position of the assembly in the master cylinder according to the liquid level from outside the brake cylinder after the installation of the device.

A final purpose in the invention is to devise an arrangement for removal of the whole plug assembly when refilling the master cylinder without disturbing the adjustment of the liquid level pre-setting.

These together with numerous other objects of invention, which will become later apparent as the following description proceeds, are attained by my device, a preferred embodiment of which has been disclosed in the accompanying drawings, wherein.

Figure 1:
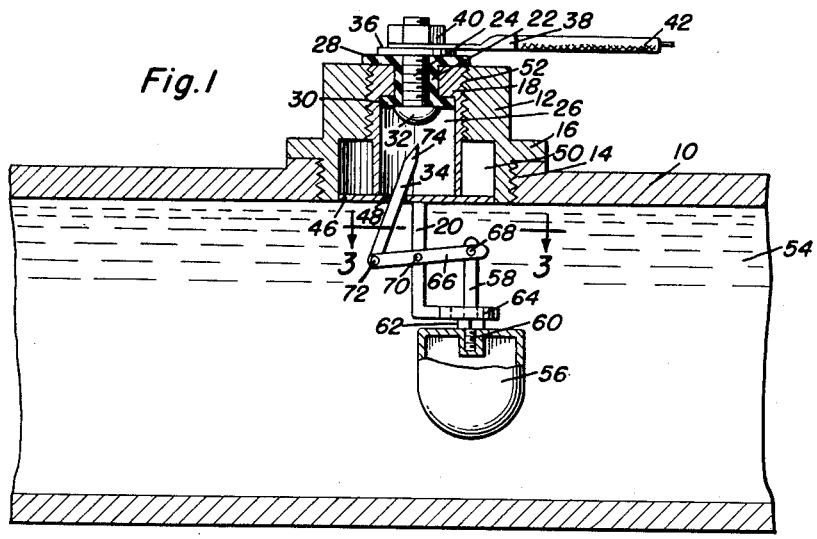
Figure 1 is a fragmental vertical longitudinal sectional view of an automobile brake master cylinder showing the invention mounted on a substitute plug in section, and its float in partial section.
Figure 2:
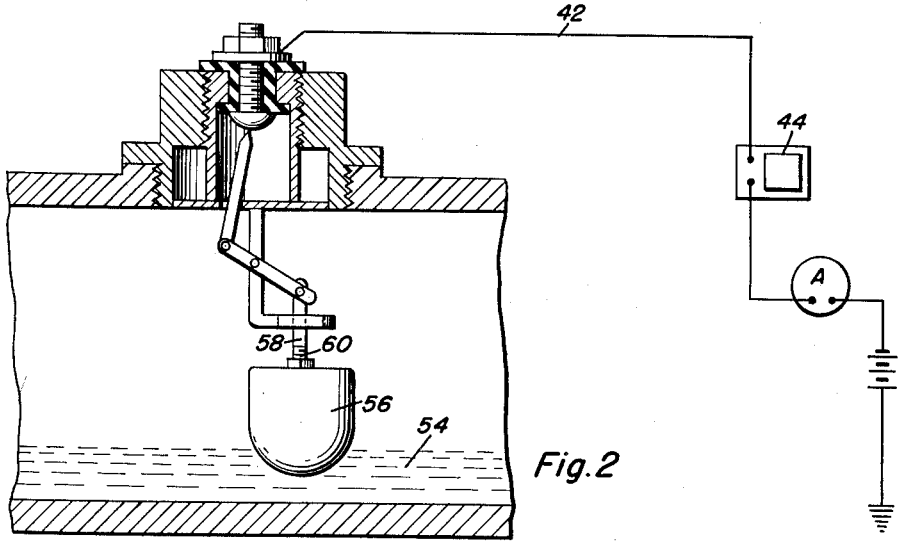
Figure 2 is a fragmentary vertical longitudinal section, similar to Figure 1, showing the switch means in alarm position and a schematic diagram of the alarm circuit.
Figure 3:
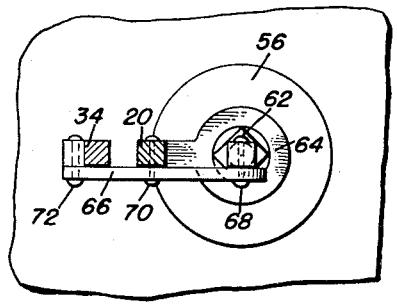
Figure 3 is a horizontal longitudinal sectional view taken substantially upon the plane indicated by the section line 3—3 of Figure 1.

In the figures the same numerals refer to similar parts. Referring now more specifically to Figures 1 and 2, 10 denotes a conventional master cylinder body of a hydraulic brake system. The substitute master cylinder refill plug is indicated generally by 12, with the plug assembly threadedly engaged in master cylinder 10 by threads as shown at 14. The flange projection 16 bears against the top surface of the threaded orifice in the master cylinder. Various bodies of plugs, adapted to fit the various models and varieties of master cylinders now generally in use in automobiles may be employed. A standard threaded sleeve assembly, shown generally at 18, is provided thus permitting easy adaptation to all makes of master cylinders now in use. Fixed to the inner sleeve is the stationary switch contact and a support bearing the movable contact and float mechanism. The arrangement is such that when refilling of the master cylinder is to be undertaken, the electrical lead may be disconnected and plug body 16 unscrewed, to withdraw the whole assembly but not disturbing the float system and switch contact and its pre-set adjustment.

The sleeve assembly 18 has an axial bore to receive resilient insulator 22 and bolt 24 extending therethrough. The head of the bolt is received in an axially enlarged bore. The space thus formed and designated as 26 provides a switch working space or well. The insulator 22 has an outer flange extension 28 to insulate the contact on top and the bottom extension 30 to insulate the head of the bolt from the sleeve. The head of the bolt indicated as 32, acts as the stationary contact means to cooperate with plunger 34, the moving contact. Bolt 24 is threadedly engaged in nut 40 to clamp against washer 36 and lug 38 of the alarm system connection lead 42.

Lead 42, shown schematically in Figure 2, is connected to a buzzer or other signal means as for example a light on the dashboard of the car, generally designated by 44 and suitably connected to an ammeter terminal of the car and/or through the ignition switch to the ungrounded side of the battery. The ammeter connection and car switch A and the battery are shown schematically. The other side of the battery is grounded, as is customary. It is to be understood that the master cylinder itself, being attached to the frame of the car, is likewise grounded. To the inside edge or end of the sleeve 18 is secured a baffle 46 by any suitable means as by soldering or welding. The baffle thus seals bore space 26 with exception of aperture 48 which comprises a guide to direct the switch plunger or pointer 34 toward the other contact 30. The baffle also serves to limit the splash of brake liquid into the contact space so that the arcing on breaking of contact and the subsequent breakdown over a long period of time of the brake fluid resulting in pitting of the contact will be minimized.

The baffle plate is slidably engaged in a further enlargement of the axial bore of the plug providing space 50. Space 50 is desirable in some case to retain a resilient packing for sealing the threads 52; but in most cases the long thread on sleeve 18 received in similar threads on body 12 will effectively seal against the escape of the brake fluid from the master cylinder. The choice of fine threads and a suitable material, as for instance brass for sleeve 18, will provide against seepage through the threads. In other embodiments of my invention the extension of the baffle to engage the enlarged bore and to provide space 50 for a suitable resilient packing is unnecessary. The threaded sleeve enables adjustment vertically of the float means from outside the master cylinder after installation of the assembly. In such case, the insulator 22 is of smaller diameter on the top face of the sleeve and suitable grasping means for the sleeve may be provided such as dowel holes in the sleeve when exposed beyond washer 28, to receive a suitable wrench. The brake liquid is designated as 54. The float 56 has a stem 58 attached by threads 60 in the top of the float. The lock nut 62 permits the adjustment of stem 58 in float 56. Stem 58 slidably extends through annular portion 64 of the support stem 20 and is arranged at right angles, or is integrally a part of support 20 formed by bending. Support 20 is fixed at its upper end to the baffle plate 46 and is hence fixed to the central threaded sleeve.

The free end of stem 58 is pivoted to fulcrummed lever 66 by pin 68. Lever 66 is pivoted by suitable pin or rivet 70 to the support 20. The other end of the lever 66 is linked by a pivot pin 72 to the previously mentioned plunger 34, bearing on its free end contact point 74. When the liquid level is high the float 56 exerts pressure upward and by means of the lever system causes plunger 34 to be retracted from the other contact 32 opening the circuit. The threaded engagement 60 permits adjustment of stem 58 and the permissible motion of the float. Consequently plunger 34 is limited in its motion proportionally. This adjustment arranges for presetting of the contacts to meet when the liquid level falls a certain distance with respect to the sleeve 18. This adjustment is made before insertion of the plug body in the refill aperture of the brake cylinder. Figure 2 shows the closed position of the contacts when alarm is given, as when the liquid has dropped to a dangerous or nearly dangerous level.

The present invention provides adjustment of the contact movement distance by the threads 60 of stem 58 and of the float 56 with lock nut 62 to fix the adjustment, and in addition the vertical adjustment of the central sleeve in the plug body for final adjustment after the assembly is installed on the cylinder. Since the suspension system is intended for installation on different makes and models of master cylinders by employing a single standard device, this vertical adjustment is advantageous especially for the other reason of making a single mechanism to fit all makes and styles of master cylinders. Together with the standard central sleeve mechanism, I use various plugs to fit the various master cylinders currently in use.

From the foregoing it will be seen that the principles of the invention are adapted to a variety of modifications and may be employed in diverse ways, and accordingly it is not intended to limit the invention to the exact construction shown and described, but all suitable modifications and equivalents may be resorted to falling within the scope of the appended claims.

Having described the invention, what is claimed as new is:

1. A float operated switch comprising a support member having a threaded portion adapted to be receivably engaged in the filling opening in the master cylinder of a hydraulic brake system, an arm depending from said member, a laterally projecting guide eye portion at the lower end of said arm, a float including an upstanding stem slidably received in said eye portion, said eye portion forming a stop limiting upward movement of the float, a link pivoted intermediate its ends to the arm above the eye portion, a contact carried by the member, said member having a recess therein accommodating said contact, a bottom plate secured to the member and closing the lower end of said recess, said arm being fixed to said plate, and a conductive switch plunger slidably carried by the plate and extending upwardly into the recess for movement into and out of direct engagement with said contact, one end of said link being pivoted to the upper end of said stem and the other end of said link being pivoted to the lower end of said plunger.

2. The combination of claim 1 wherein said recess includes a lower enlarged portion forming a sealing-packing accommodating chamber, and a rigid sleeve threaded in said recess and supporting the plate and the contact, said contact being insulated from the sleeve.

3. A float operated switch comprising a support member having external threads at one end for receivably engaging the opening in a master brake cylinder, said member having an axial passage including an upper threaded end and a lower enlarged end, a rigid conductive sleeve threaded in the passage and extending into the enlarged end of the passage, a plate secured to the sleeve and closing the lower end of the passage, a contact supported by and insulated from the sleeve and having a portion entering the upper end of the sleeve, an arm secured to and depending from the plate and including a laterally projecting eye portion, a float having a stem slidably received by said eye portion, a contact plunger movable into and out of direct contacting engagement with said contact, said plate having a slot slidably receiving said plunger, said plunger extending upwardly into the sleeve through the slot, the lower end of said sleeve being free of obstruction to permit the plunger to move into direct contacting engagement with the contact, and a link pivoted intermediate its ends to the arm and terminally pivoted to said stem and said plunger.

THOMAS R. LUCZKO.

References Cited in the file of this patent

UNITED STATES PATENTS

| Number | Name | Date |
|---|---|---|
| 898,231 | Madeleine | Sept. 8, 1908 |
| 1,095,811 | Carr | May 5, 1914 |
| 1,615,647 | Pierce | Jan. 25, 1927 |
| 1,963,123 | Flynn | June 19, 1934 |
| 2,253,260 | Alcorn | Aug. 19, 1941 |
| 2,494,802 | Fox | Jan. 17, 1950 |